O. H. P. ROBINSON.
Carpenters' Square.
No. 70,901.  Patented Nov. 12, 1867.
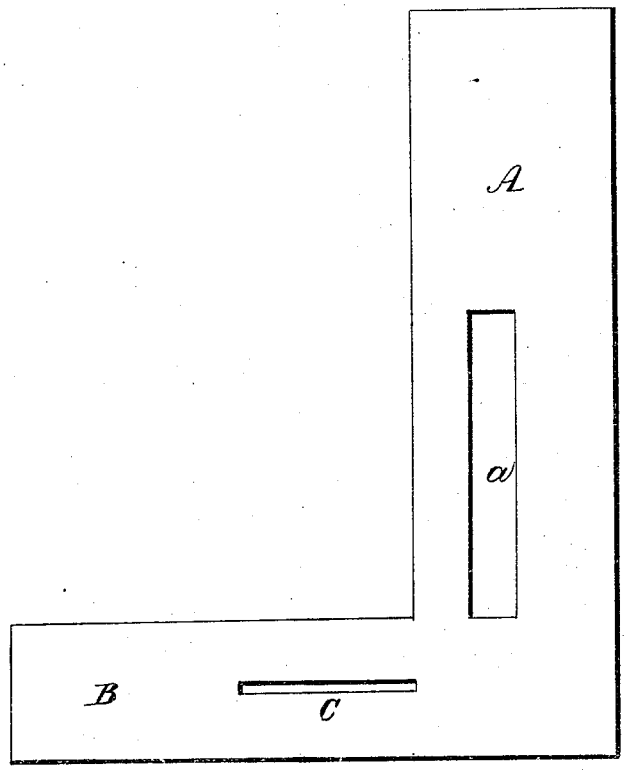
Witnesses.
J. A. Service.
W= Trewin.
Inventor.
O. H. P. Robinson
Per Munn & Co.
Attys.

United States Patent Office.

O. H. P. ROBINSON, OF BELLPORT, NEW YORK, ASSIGNOR TO HIMSELF AND JOHN B. ROBINSON, OF SAME PLACE.

Letters Patent No. 70,901, dated November 12, 1867.

IMPROVEMENT IN CARPENTERS' SQUARES.

The Schedule referred to in these Letters Patent and making part of the same.

TO ALL WHOM IT MAY CONCERN:

Be it known that I, O. H. P. ROBINSON, of Bellport, in the county of Suffolk, and State of New York, have invented a new and useful Improvement in Carpenter's Square; and I do hereby declare that the following is a full, clear, and exact description thereof, which will enable those skilled in the art to make and use the same, reference being had to the accompanying drawings, forming part of this specification, in which the drawing represents a square having my improvement.

Similar letters of reference indicate corresponding parts.

The object of this invention is to enable carpenters and builders to lay out the mortises in framing houses with dispatch and accuracy; and it consists in making a slot in the main bar of the square for scribing the mortise directly within it, instead of measuring and scribing on the outer sides of the square in the ordinary manner.

A represents the main bar and B the tongue or side bar of a carpenter's square. In the main bar I cut a slot, a, having parallel sides and ends adapted in size to the ordinary mortises made in timber for house-framing, within which slot the mortise may be directly and accurately marked out with a scribe. In the tongue B a slot, c, of different size may be made if desired; but one slot in the main bar will be generally found sufficient.

Having described my invention, I claim as new, and desire to secure by Letters Patent—

A carpenter's square provided with a slot, a, in the manner and for the purpose described.

O. H. P. ROBINSON.

Witnesses:
GEORGE WEIDNER,
JOHN WEIDNER.